United States Patent [19]
Dolan et al.

[11] Patent Number: 5,818,347
[45] Date of Patent: Oct. 6, 1998

[54] IDENTIFICATION OF HVAC SYSTEMS IN A COMMUNICATION NETWORK

[75] Inventors: Robert P. Dolan, Syracuse; Thomas R. Phillips, Cicero; Thomas L. DeWolf, Liverpool; Mark A. Hill, Lafayette, all of N.Y.

[73] Assignee: Carrier Corporation, Syracuse, N.Y.

[21] Appl. No.: 578,348

[22] Filed: Dec. 26, 1995

[51] Int. Cl.⁶ .............. H04Q 5/22; G06F 12/00; G05B 13/02; A01K 41/00
[52] U.S. Cl. .............. 340/825.52; 395/410; 364/164; 236/2
[58] Field of Search .............. 340/825.52, 825.21, 340/825.07; 395/200.1, 200.11, 200.16, 829; 364/164; 236/2, 37, 91; 165/201, 287

[56] References Cited

U.S. PATENT DOCUMENTS

| | | | |
|---|---|---|---|
| 4,526,010 | 7/1985 | Sato et al. | 371/34 |
| 4,982,404 | 1/1991 | Hartman | 371/62 |
| 5,097,449 | 3/1992 | Cuevas | 365/228 |
| 5,103,391 | 4/1992 | Barrett | 364/133 |
| 5,104,037 | 4/1992 | Karg et al. | 236/46 R |
| 5,111,457 | 5/1992 | Rabjohns et al. | 371/10.1 |
| 5,309,445 | 5/1994 | Bartels | 371/21.3 |
| 5,357,525 | 10/1994 | Moriue et al. | 371/32 |
| 5,359,659 | 10/1994 | Rosenthal | 380/4 |
| 5,426,585 | 6/1995 | Stepper et al. | 364/424.03 |
| 5,454,510 | 10/1995 | Manson et al. | 236/51 |
| 5,495,722 | 3/1996 | Manson et al. | 236/51 |
| 5,539,879 | 7/1996 | Pearce et al. | 395/184.01 |
| 5,553,238 | 9/1996 | Nelson | 395/185.07 |
| 5,555,269 | 9/1996 | Friday et al. | 364/185 |
| 5,565,855 | 10/1996 | Knibbe | 340/825.06 |
| 5,579,482 | 11/1996 | Einkauf et al. | 395/200.1 |
| 5,579,993 | 12/1996 | Ahmed et al. | 236/49.3 |
| 5,590,831 | 1/1997 | Manson et al. | 236/51 |

FOREIGN PATENT DOCUMENTS

| | | |
|---|---|---|
| 615211 | 9/1994 | European Pat. Off. . |
| 63-298602 | 6/1988 | Japan . |
| 05165734 | 2/1993 | Japan . |
| 07210215 | 11/1995 | Japan . |

*Primary Examiner*—Michael Horabik
*Assistant Examiner*—Anthony A. Asongwed

[57] ABSTRACT

An HVAC system is assigned a network identification for subsequent use within a communication network upon receipt of a formatted signal containing the network identification. The HVAC system stores the network identification in nonvolatile memory. The HVAC system also preferably stores a verification image of the communicated network identification so that any reading back of the network identification can be validated through comparison with the stored verification image.

19 Claims, 8 Drawing Sheets

| MEMORY ADDRESS INDEX "i" | ADDRESSABLE LOCATION | |
|---|---|---|
| | PARAMETER STORED IN LOWER BYTE | TYPE OF VERIFICATION IMAGE IN UPPER BYTE |
| 0 | HEAT CONTROL | SAME VALUE |
| ⋮ | ⋮ | ⋮ |
| 5 | FAN CONTROL | SAME VALUE |
| 6 | HVAC TYPE | ONES COMPLEMENT |
| 7 | HVAC TYPE | ONES COMPLEMENT |
| 8 | HVAC TYPE | ONES COMPLEMENT |
| 9 | NETWORK ID | TWOS COMPLEMENT |
| 10 | NETWORK ID | TWOS COMPLEMENT |
| 11 | NETWORK ID | TWOS COMPLEMENT |

| MEMORY ADDRESS INDEX "i" | CONTROL VARIABLE | HEADER BYTE CODE | DEFAULT VALUES | RANGE OF VALUES |
|---|---|---|---|---|
| 0 | VARIABLE (0) | CODE 1 | DEFAULT 1 | RANGE 1 |
| ⋮ | ⋮ | ⋮ | ⋮ | ⋮ |
| 5 | VARIABLE (5) | CODE 6 | DEFAULT 6 | RANGE 6 |
| 6 | UNIT_TYPE | CODE 7 | DEFAULT 7 | RANGE 7 |
| 7 | UNIT_TYPE | CODE 7 | DEFAULT 7 | RANGE 7 |
| 8 | UNIT_TYPE | CODE 7 | DEFAULT 7 | RANGE 7 |
| 9 | NTWK_ID | CODE 8 | DEFAULT 8 | RANGE 8 |
| 10 | NTWK_ID | CODE 8 | DEFAULT 8 | RANGE 8 |
| 11 | NTWK_ID | CODE 8 | DEFAULT 8 | RANGE 8 |

FIG.5

IDENTIFICATION OF HVAC SYSTEMS IN A COMMUNICATION NETWORK

BACKGROUND OF THE INVENTION

This invention relates to the control of heating, ventilating and air conditioning systems through the use of a communication network. In particular, this invention relates to how an HVAC system is identified within a communication network.

The use of a communication network to convey control information via a common communication bus to heating and/or cooling systems connected to the bus is well known. Such networks are often used when one wishes to implement a hierarchical control of several heating or cooling systems. A central or master controller in such a hierarchical control will normally communicate with the individual heating or cooling systems connected thereto via a common control bus. It is often necessary in such instances to separately identify each heating or cooling system so that they can be separately addressed by the central or master controller. This has been heretofore accomplished by physically setting a series of address switches within each heating or cooling system. The physically set switches define a binary address that can be used by the system to identify itself to the central or master controller. Such a physical setting of the address switches to define an address or network communication identification can be time consuming when setting up a network of heating or cooling systems that is to be subject to the hierarchical control of a central or master controller. This time consuming approach is, however, usually justified on the basis that each such system must be able to rely on this fixed identification or address at all times including instances where power is lost and all systems must be again brought up to an appropriate level of control following restoration of power.

OBJECTS OF THE INVENTION

It is an object of the invention to provide each HVAC system within a communication network with the capability of being quickly, easily, and reliably assigned a particular network communication identification.

SUMMARY OF THE INVENTION

The above and other objects of the invention are achieved by providing a heating or cooling system with a receiver capable of receiving a signal that defines a network identification to be assigned to the heating or cooling system. The signal containing network identification is in a format recognizable by a programmed processor associated with the receiver. The programmed processor sets a network identifier variable within a program being executed by the processor equal to the received network communication identification. The value of this variable is thereafter preferably stored in at least one particular addressable memory location of a non-volatile memory associated with the programmed processor. A verification image of this stored value is also preferably generated and stored in another portion of the same addressable memory location so as to be recallable along with the stored value of this variable. The thus stored value of the network communication identification and its verification image must be successfully read back in order for the stored value to be used by the programmed processor following a power outage. In this regard, the stored value must have a predetermined relationship with the stored verification image in order for the processor to use the value. The processor will otherwise proceed to use a default value that will at least allow some network communications to take place with the particular heating or cooling system.

In accordance with another aspect of the invention, the particular value of the variable and its verification image are stored in more than one particular addressable memory location. In the event that the value and its respective verification image read stored in a first addressable memory location does not demonstrate the predetermined mathematical relationship, the processor will proceed to read and compare the stored value and verification image from at least one additional addressable storage locations. After exhausting all possible read and compares, the processor will set the network identifier equal to a default value.

In accordance with another aspect of the invention, the network identification for the particular HVAC system is preferably transmitted to the system by a hand held transmitter. This allows a person to assign an identification to an HVAC system even if it is not easily accessible.

BRIEF DESCRIPTION OF THE DRAWINGS

Other objects and advantages of the present invention will be apparent from the following description in conjunction with the accompanying drawings in which.

DESCRIPTION OF THE PREFERRED EMBODIMENT

Figure 1:
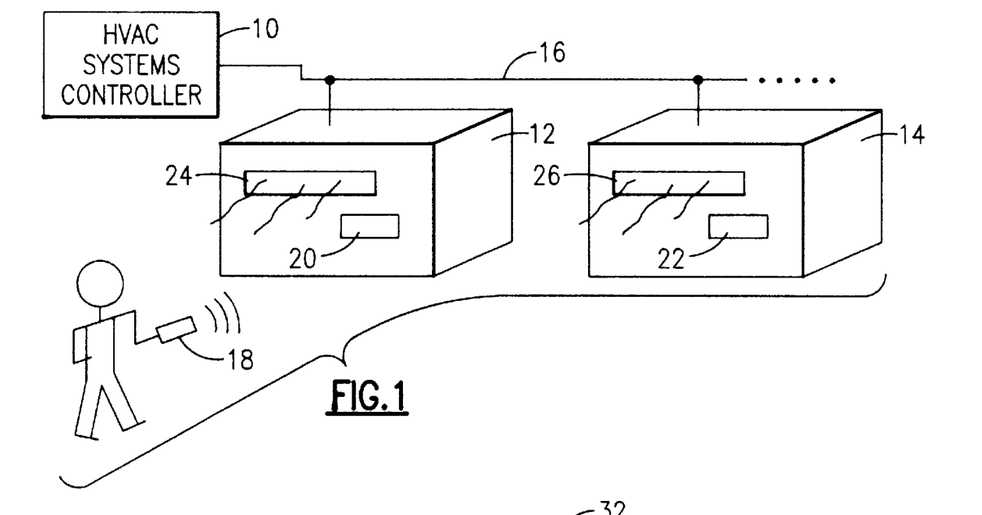
FIG. 1 illustrates a plurality of HVAC systems each connected via a common control bus to an HVAC systems controller.

Referring to FIG. 1, an HVAC systems controller 10 is connected to an HVAC system 12 and an HVAC system 14 via a control bus 16. Each HVAC system receives control information from the HVAC systems controller 10 or, in the alternative, from a hand held remote control device 18. The HVAC system 12 receives the remote control signal at an infrared receiver 20 whereas the HVAC system 14 receives the remote control signal at an infrared receiver 22. The HVAC system 12 provides conditioned air through a ventilated opening 24 whereas the HVAC system 14 provides conditioned air via a ventilated opening 26. It is to be appreciated that there may be many more HVAC systems connected to the control bus 16. These HVAC systems may be installed in one large room or in several rooms of a building that is to be air conditioned by the various systems. Control information is normally provided to each individual system by the HVAC system controller 10 identifying a particular HVAC system through a network identification and thereafter communicating information to that particular system having that particular network identification.

Figure 2:
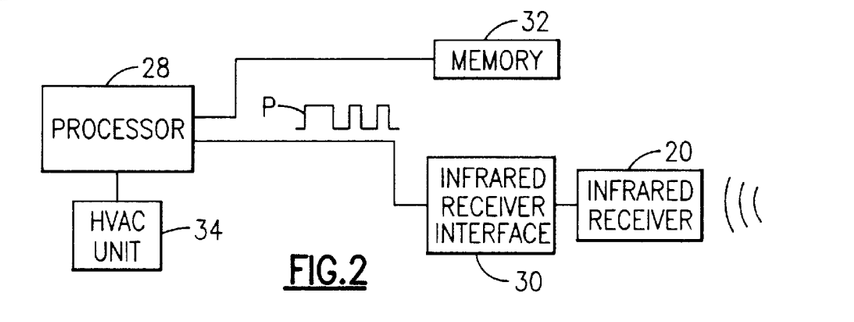
FIG. 2 illustrates a particular HVAC system having a processor connected to the control bus of FIG. 1 and being furthermore connected to an HVAC unit for providing conditioned air.

Referring now to FIG. 2, the internal configuration of the HVAC system 12 is illustrated. A processor 28 within the HVAC system 12 receives control information from either the control bus 16 or from an infrared receiver interface 30 associated with the infrared receiver 20. Control information is received from either source in a predefined format. The formatted information is to be stored in a particular manner in a control memory 32 associated with the processor 28. The control memory 32 is preferably a non-volatile memory such as an electrically erasable programmable read only memory (EEPROM). Control information stored in such a memory will survive a power outage. The processor utilizes the stored control information in the memory 32 to control a particular HVAC unit 34 within the HVAC system 12. The HVAC unit 34 may be one of several different types of HVAC units.

Referring to the remote control device 18, this device is preferably programmed so as to scroll through various displayed network identifications upon depression of a selection button. The person depressing the selection button selects a particular displayed identification by releasing the selection button. The selected network identification is transmitted to the receiver 20 upon depression of another button. The signal coming from the remote control device will have a particular signal format that can be recognized by the programmed processor. In particular, the signal format will preferably begin with a header byte identifying the control parameter being transferred. The header byte will be followed by a byte containing the value of the network identification. The final byte will be a check sum of the header byte and the byte containing the value of the denoted control parameter. The infrared receiver interface 30 generates an interrupt pulse "P" to an interrupt input of the processor as the infrared signal is being received from the remote control. The infrared receiver interface generates pulses of encoded bits representing the aforementioned bytes from the infrared signal and sends these pulses to the processor following the interrupt pulse. The processor reads the header pulses defining the header byte as well as the data pulses defining the value of the network identification and the check sum pulses. The processor will store the header byte and the network identification value byte in a software buffer for later reading by the processor provided the check sum condition is satisfied.

It is to be appreciated that in addition to the above discussed receipt of the network identification, other control information can be similarly delivered to the processor 28 from either the systems controller 10 or the remote control device 18. In this regard, other pieces of control information having an identifiable header byte and a control parameter value byte and a check sum byte can be transmitted to and read by the processor 28 in the same manner as heretofore discussed for the network identification.

Figure 3:
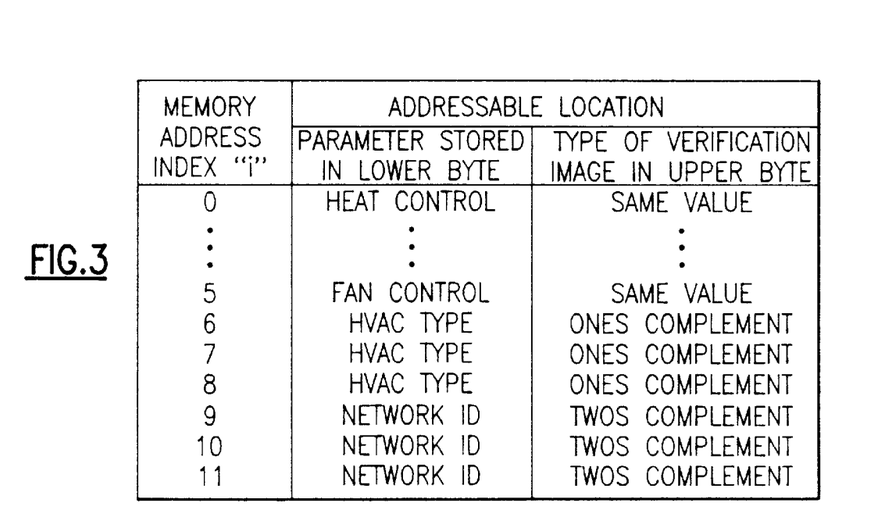
FIG. 3 illustrates the storage of information for the HVAC system of FIG. 2 in a memory associated with the processor of FIG. 2.

Referring now to FIG. 3, an example of how control information for the HVAC system 12 is to ultimately be stored in memory 32 is illustrated. The examplary control information is stored in addressable memory locations having address indexes numbered zero through eleven. It is to be understood that these address indexes can represent or easily be mapped to the particular addresses of these memory locations. Each addressable memory location has a stored control parameter value in a lower byte portion of the addressable location and a stored verification image value in each upper byte portion of the same addressable memory location.

The control parameter value for the network identification of the HVAC system 12 is preferably stored in the lower byte portions of three successive memory locations having address indexes nine through eleven. The verification image of this control parameter value is preferably stored in the upper byte portions of these memory locations. The verification images for each of the thus stored control parameter values are the twos complement of these stored control parameter values.

Figure 4A:
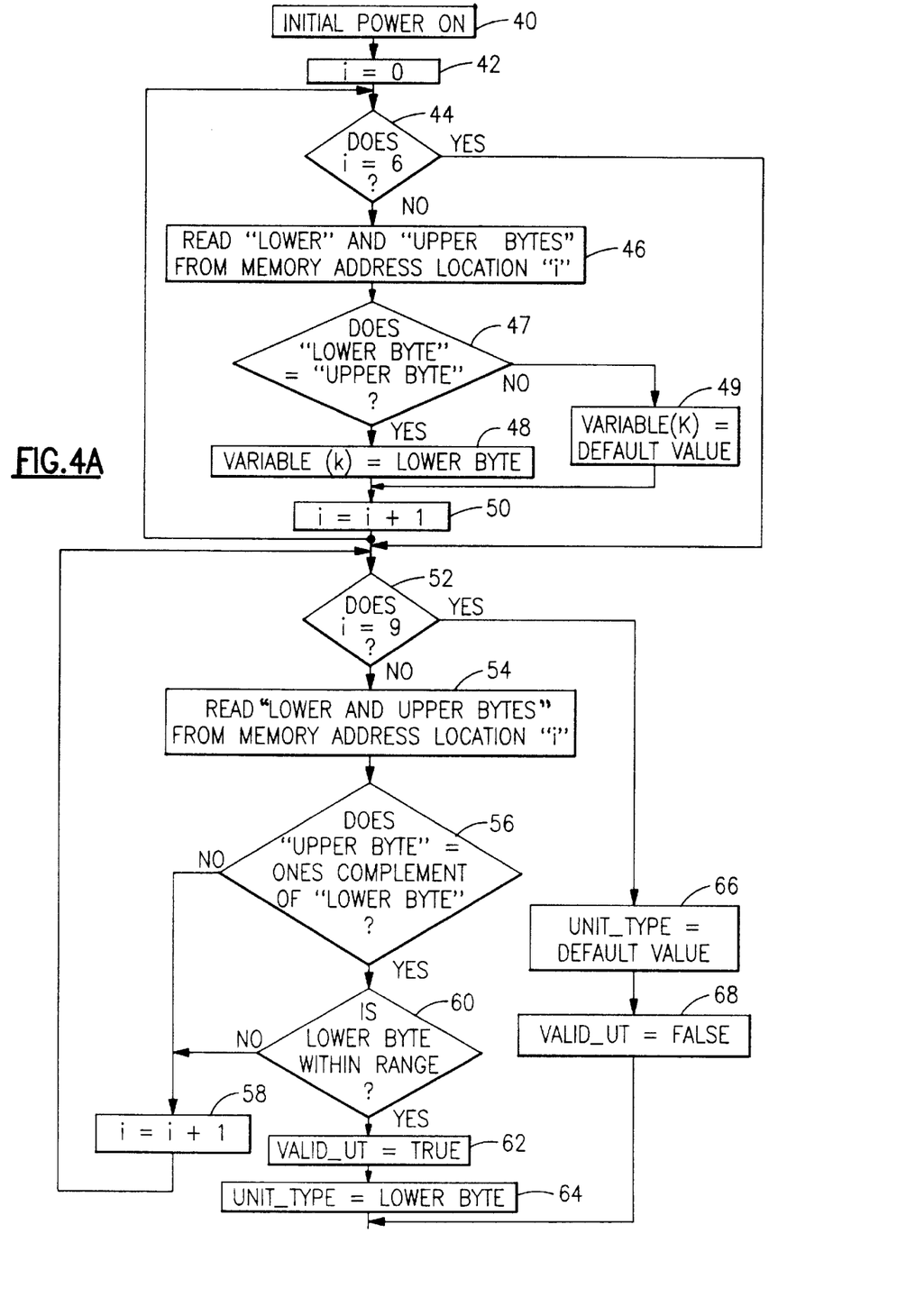
FIGS. 4A–4F illustrate a process executable by the processor of FIG. 2 for reading information from as well as writing information to the memory associated with the processor.
Figure 4B:
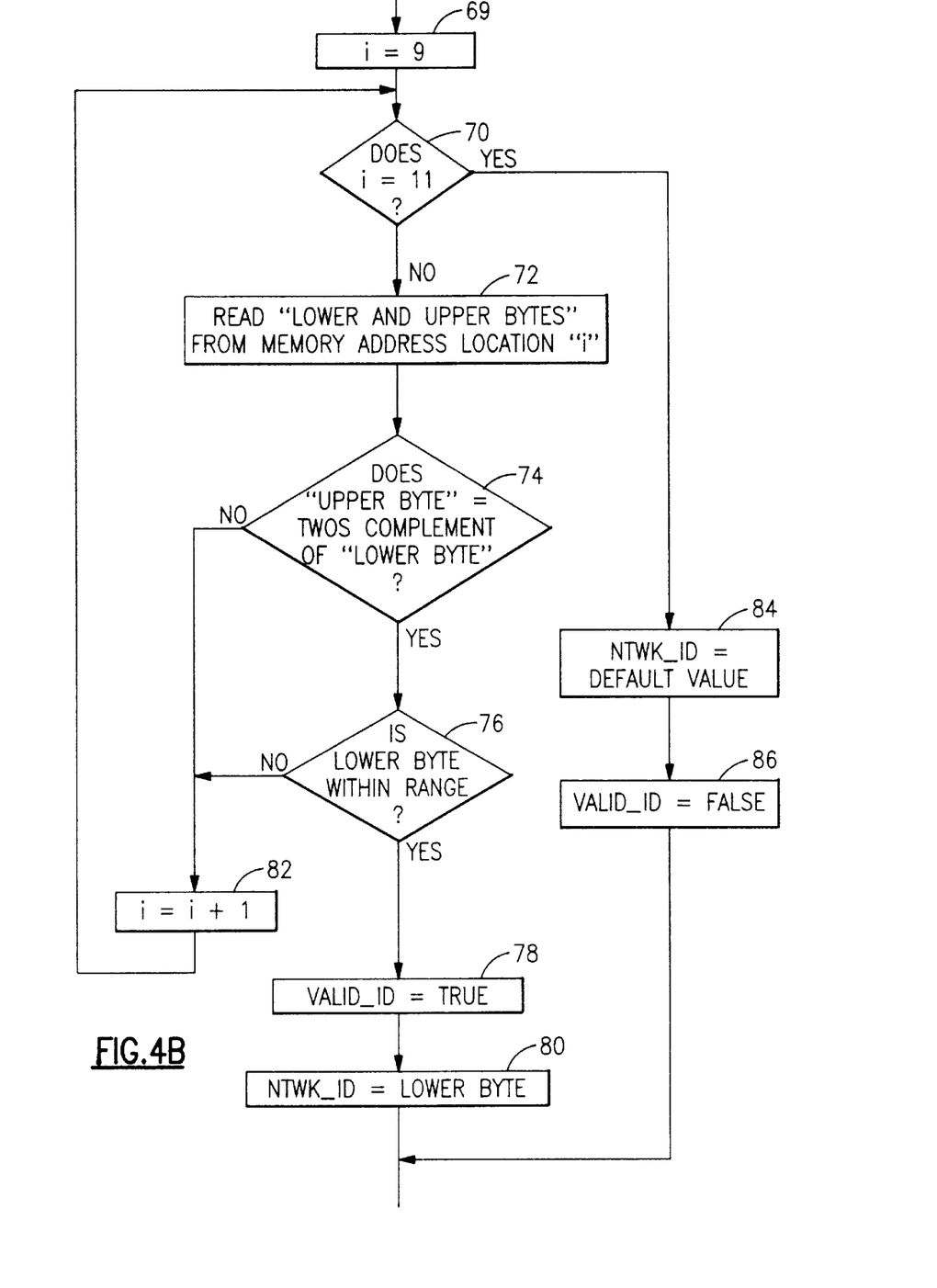
Figure 4C:
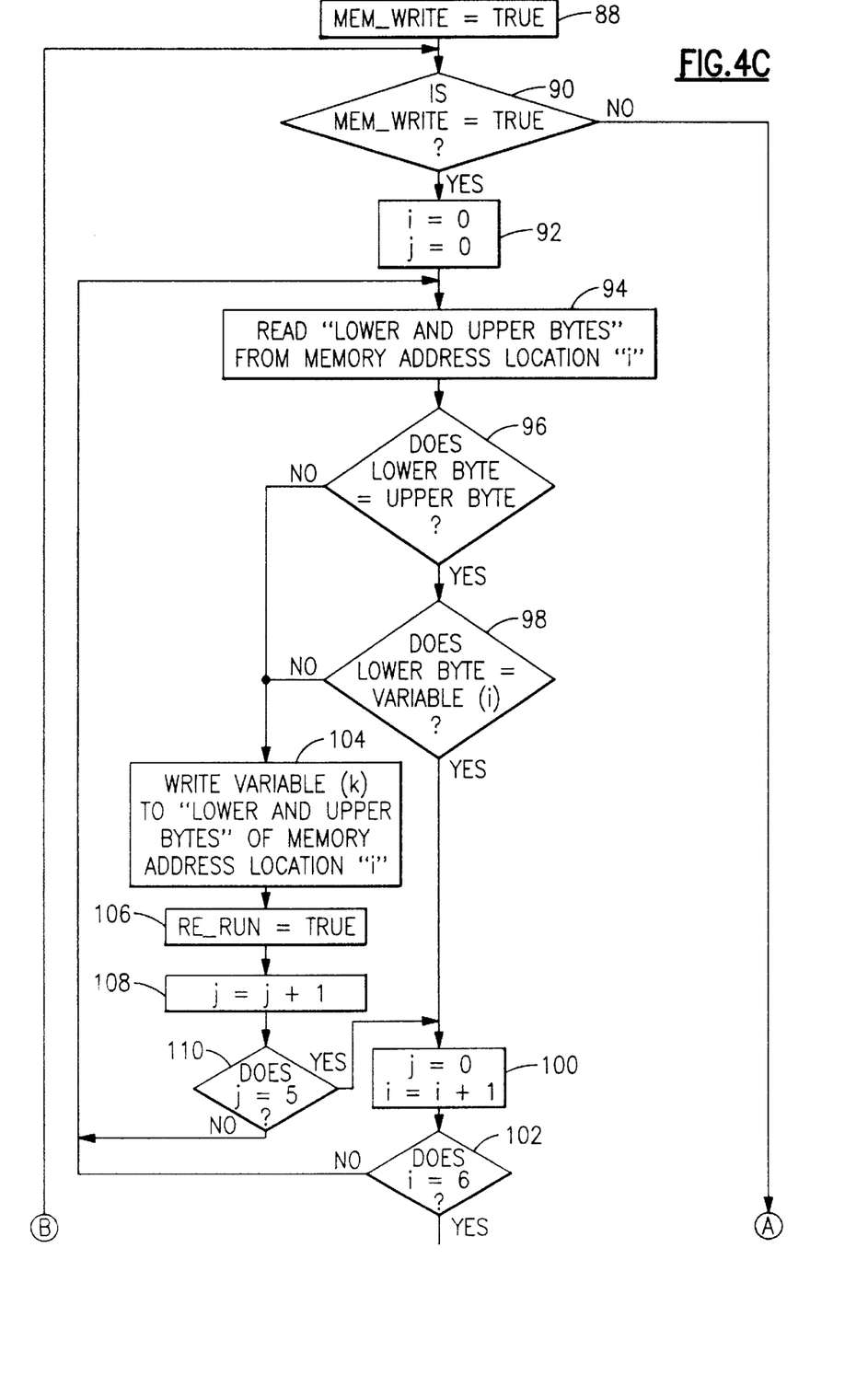
Figure 4D:
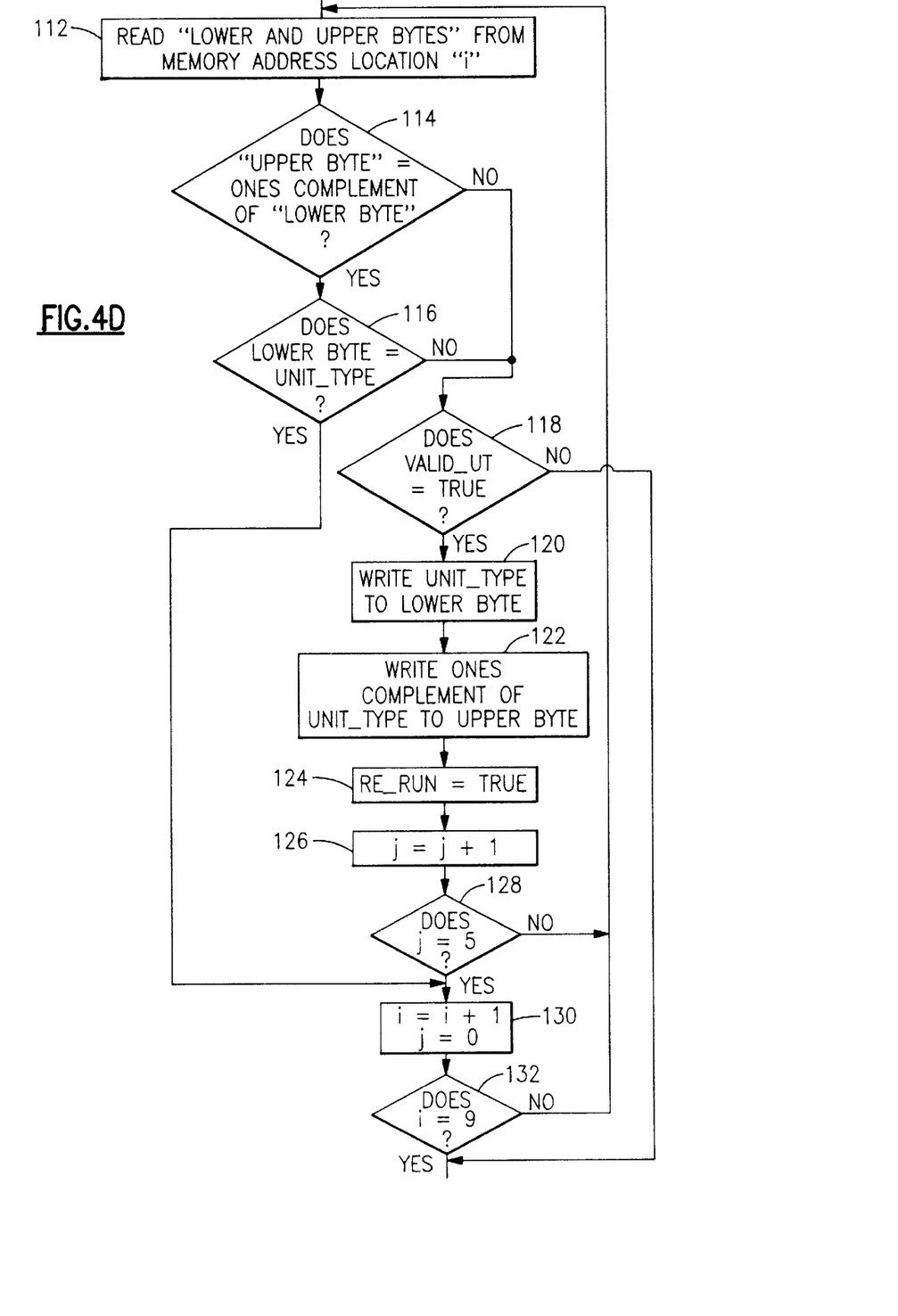
Figure 4E:
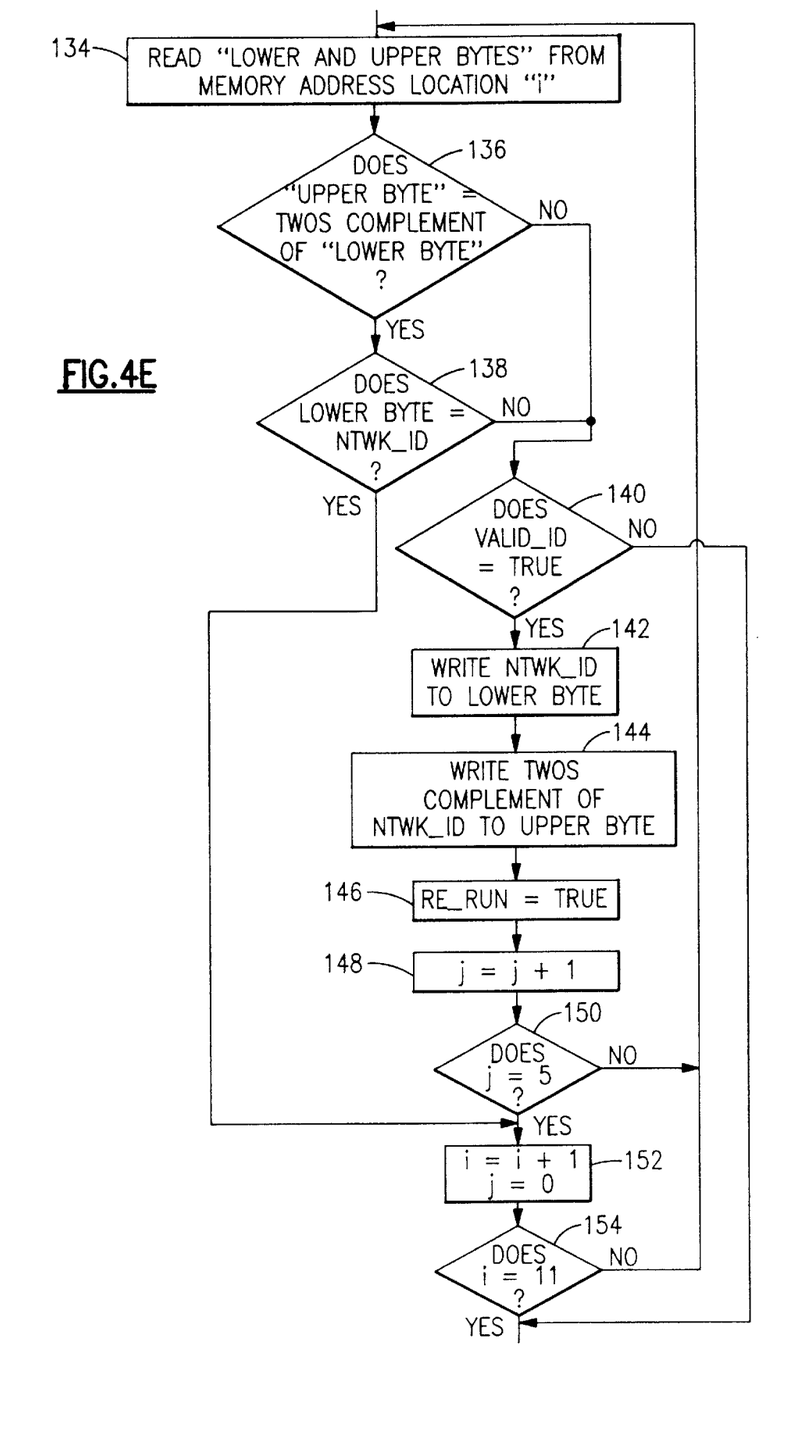
Figure 4F:
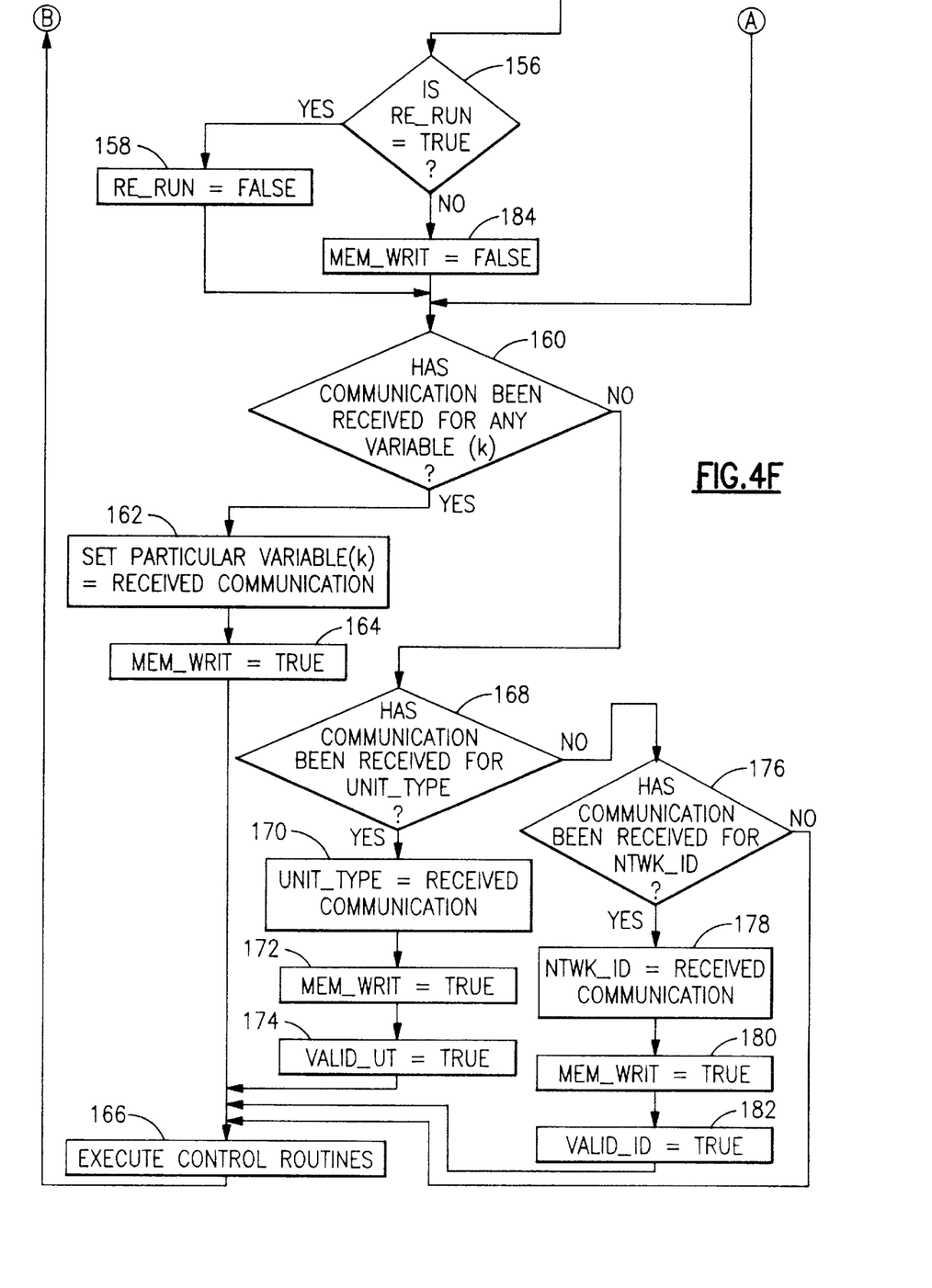
Figure 5:
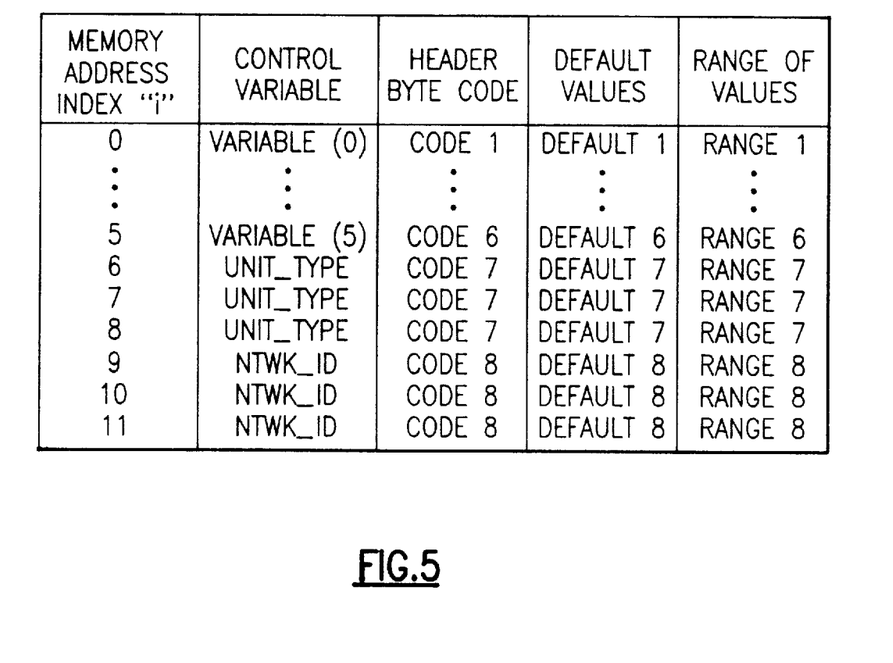
FIG. 5 illustrates a look up table used by the processor in executing the process of FIGS. 4A–4F.

Referring now to FIG. 4A, a process for reading the various control parameter values stored in the memory 32 begins with a step 40 that indicates that electrical power has been provided to the processor 28. The processor 28 proceeds to a step 42 and sets the memory address index "i" equal to zero. The processor proceeds in steps 44 through 68 to successively read the upper and lower bytes from address locations zero through eight and compares these bytes for being in compliance with the particular mathematical relationship that is required for these bytes. In the event that the particular mathematical relationship is satisfied for a particular location, the processor will proceed to set a denoted variable equal to the lower byte of the memory location under examination. The processor preferably uses a look up table such as is set forth in FIG. 5 to identify the particular variable that is to be set equal to the lower byte of memory locations zero through five. This is not required for memory locations six through nine. In the event that the lower and upper bytes of all locations for a particular variable do not demonstrate an appropriate mathematical relationship when read, the processor proceeds to set the particular variable equal to a default value.

The processor will ultimately proceed from either step 64 or step 68 to a step 69 and set the memory address index "i" equal to nine. Inquiry is made in a step 70 as to whether the memory address index, "i" is equal to eleven. Since the memory address index will initially equal nine, the processor will proceed to a step 72 and read both the lower and upper bytes from the particular memory address location identified by this memory address index "i". The processor proceeds in a step 74 to inquire whether the thus read upper byte from the memory address location "i" is equal to the twos compliment of the lower byte read from the same memory address location.

Referring to FIG. 3, the verification image stored in the upper byte portion of each addressable location identified by memory address indexes nine through eleven should be the twos compliment of the network identification value. The above will not be the case if the value of the network identification or its twos compliment verification image are not properly read from the memory location under examination. In this case, the processor 28 will proceed out of step 74 along the no path to a step 82 and increment the memory address index "i" by one. The processor will thereafter return to step 70 and again proceed to step 72 if the new memory address index does not equal eleven. Assuming that the memory address index has merely been incremented from nine to ten, the processor will proceed to step 74 and read the lower and upper bytes from the memory address location indicated by the memory address index "i" equal to ten. The processor will again inquire in step 74 as to whether the upper byte is equal to the twos compliment of the lower byte stored in this particular memory address location. Assuming that the network identification value and its ones compliment verification image is correctly read from this addressable location, the processor will proceed from step 74 to step 76 and inquire as to whether the lower byte is within a specific range of permissible values. The permissible range of values for the network identification will preferably be part of the look up table of FIG. 5 and hence can be immediately associated with the memory location from which the network identification was read. In the event that the lower byte from the addressable memory location identified by the current memory address index "i" is not within range, the processor will proceed along the no path out of step 76 and again increment the memory address index "i" in step 82 before returning to step 70. Assuming the memory address index has now been incremented to eleven, the processor will proceed to step 72 and again read the lower and upper bytes from the corresponding memory location. Inquiry will next be made as to whether the upper byte is equal to the twos compliment of the lower byte in step 74. Assuming a twos complement relationship of these values, the processor will proceed to step 76 and again inquire as to whether the lower byte is within the predetermined range of permissible values for the network identification. If the read value of the lower byte stored in memory storage location eleven is within range of the permissible values for the network identification parameter, the processor will proceed to a step 78 and set a flag variable denoted as VALID_ID equal to true. It will thereafter set a variable denoted as NTWK_ID equal to the lower byte value in a step 80. Referring to steps 84 and 86, it is to be noted that if all memory address locations having the memory address indexes nine through eleven do not have a properly stored and read network identification value and a corresponding twos compliment verification image, then the processor will proceed in step 84 to set the NTWK_ID variable equal to a default value. The processor proceeds to step 86 wherein the flag variable VALID_ID is set equal to false.

It is to be appreciated that as a result of potentially reading up to three storage locations having the memory address indexes nine through eleven, the processor will have had an opportunity to verify a correct reading of the upper and lower bytes from at least one of these storage locations. For any such verification, the processor will also need to find that the value of a verified lower byte is within the permissible range for the network identification stored in these locations. In such a case, the processor will have set the VALID_ID flag variable equal to true in a step 78 and set the NTWK_ID control variable equal to the value of the lower byte in the particular storage location which passed the successive tests of steps 74 and 76. In the event that none of the byte values read from the storage locations nine through eleven passed the steps dictated by steps 74 and 76, then the processor will have set the NTWK_ID variable equal to a default value from the look up table in FIG. 5 and set the flag variable VALID_ID equal to false.

The NTWK_ID control variable will preferably appear in a communication protocol program executed by the processor 28 when it wishes to identify itself to the systems controller 10. In this regard, the systems controller 10 will have been programmed to query the HVAC systems 12 and 14 for a match of possible network identifications within a range of possible network identifications stored in the systems controller 10. This range will preferably correspond to the permitted range of values in step 76. When the systems controller sends out the particular network identification corresponding to the value of the NTWK_ID variable, the HVAC system 12 will respond and identify itself as being the particular HVAC system having the assigned network identification. This allows the systems controller to thereafter effectively communicate with the HVAC system 12 using the particular network identification.

The processor will proceed out of either step 80 or step 86 to a step 88 wherein the flag variable noted as MEM_WRIT will be set equal to true. The processor proceeds from setting MEM_WRIT equal to true in step 88 to a step 90 wherein an inquiry is made as to whether MEM_WRIT is equal to true. MEM_WRIT will have been set equal to true in step 88 so as to thereby cause the processor to proceed to a step 92. As will become apparent hereinafter, the process beginning with step 92 is directed to writing values and respective verification images of values to the memory 32 under a variety of circumstances.

Referring to step 92, the memory address index "i" is set equal to zero. Another index "j" which will be used to track the number of write attempts to a particular memory location in the memory 32 is also set equal to zero. The processor proceeds in steps 94 through 132 to examine memory locations zero through eight to determine whether the read upper and lower bytes of each memory location have the required mathematical relationship. The processor proceeds to write the current value of the variable associated with the memory location if the same becomes necessary. This will occur if either the read upper and lower bytes do not satisfy the required mathematical relationship or the read lower byte does not equal the current value of the corresponding variable. At such time as the memory address index "i" equals nine, the processor will proceed from step 132 to a step 134.

Referring to step 134, the processor reads the lower and upper byte portions of the storage location indicated by the current memory address index "i". The processor proceeds in a step 136 to inquire as to whether the upper byte portion of the memory location equals a twos compliment of the lower byte portion of the read memory location. Referring to FIG. 3, the upper byte value for a memory location having a memory address index of nine, ten or eleven should have a twos compliment verification image stored therein. If the read upper and lower bytes have this relationship in any memory location having one of the aforementioned address indexes, then the processor will proceed to a step 138 and inquire as to whether the lower byte value is equal to the present value of the NTWK_ID control variable being used by the processor 28. In the event that the lower byte value read from the memory 32 at the particular address storage location does not equal the value of the NTWK_ID control variable, the processor proceeds along the no path out of step 138 to a step 140. Referring again to step 136, in the event that the upper byte does not have the correct twos compliment relationship with the read lower byte value for any memory location having one of the address indexes of nine, ten or eleven, the processor will also proceed out of step 136 to step 140.

Referring to step 118, the processor inquires as to whether VALID_ID equals true. It will be remembered from steps 72 through 78 that VALID_ID will be true if the processor has previously successfully read and verified the relationship of upper byte to lower byte for at least one of the storage locations nine through eleven and has moreover verified that the lower byte is within a permissible range. Assuming that VALID_ID is true, the processor will proceed along the yes path to a step 142 wherein the value of the NTWK_ID variable in the processor 28 is written to the lower byte portion of the memory location identified by the current memory address index "i". The processor now proceeds to step 144 and writes the twos compliment of the value of the NTWK_ID variable in the processor 28 to the upper byte portion of the same memory location. The processor proceeds to set RE_RUN equal to true in step 124. The write attempt index "j" is incremented by one in step 148 before proceeding to inquire in step 150 as to whether this write attempt index "j" is equal to five. If it is not, the processor will proceed back to step 134 and again read the lower and upper byte portions of the memory location identified by the memory address index "i". To the extent that the write steps 142 and 144 were not previously successful or if the read step 134 is incorrect, the processor will so note in either step 136 or step 138. In either case, the processor will again implement steps 140 through 150 wherein another write will be attempted to this particular memory location. The processor will continue to attempt to write to this memory location until the write attempt index "j" equals five in step 150 or until the upper byte has the twos complement relationship to the lower byte as required in step 136 and the lower byte is equal to the present value of NTWK_ID in the processor 28 as required in step 138. After any successful write has been verified in steps 136 and 138 or after five successive write attempts, the processor will proceed to a step 152 and increment the memory address index "i" by one and again set the write attempt index "j" equal to zero. The processor will next inquire in step 154 as to whether the memory address index "i" is equal to eleven. As long as the memory index address "i" has not been incremented to eleven, the processor will again re-execute steps 134 through 152 and attempt to verify that a correct value of NTWK_ID has been written to the respective lower byte location and that the twos compliment thereof has been correctly written to the upper byte location. When all three memory address locations have been read and written to if necessary and thereafter verified or if the process has been attempted up to five times for each memory location, then the processor will proceed out of step 154 to a step 156.

Referring to step 156, the processor inquires whether the RE_RUN flag is equal to true. This flag will have been set equal to true in either step 106, 124 or step 146 if there has been a write to any particular memory location. If this has occurred, the processor will proceed to a step 158 and set RE_RUN equal to false. The processor thereafter proceeds to step 160 and inquires as to whether a communication has been received for any of the variables identified by variable index "k" numbered zero through five. It is to be understood that such a communication will be received in a recognizable format allowing the processor to store a header byte identifying the control parameter followed by a byte of information containing the value of the control parameter in a software buffer. The processor will read any received header bytes in the software buffer in step 160 and note whether any of the header byte codes identify a control parameter stored in one of the memory locations having an address index of zero through five. If a header byte code corresponds to any such control parameter, the processor will note the corresponding indexed "k" variable from the look up table in FIG. 5.

In the event that a communication has not been received for any of these variables, the processor will proceed to a step 168 and inquire as to whether a communication has been received for the UNIT_TYPE control variable. This will be accomplished by examining the header bytes in the software buffer to ascertain whether any of these bytes identify a parameter value having been received for the UNIT_TYPE control variable.

Assuming that no communications have been received for the UNIT_TYPE control variable, the processor will proceed along the no path out of step 168 to a step 176 wherein inquiry is made as to whether a communication has been received for the NTWK_ID variable. This will be accomplished by examining any header byte stored in the software buffer memory to ascertain whether any of these header bytes indicates that a network identification has been received from the remote control device 18. If a header byte code corresponds to the code for the network identification parameter, the processor will associate the corresponding NTWK_ID variable therewith through the look up table in FIG. 5. The processor will proceed to set the NTWK_ID variable equal to the stored network identification byte associated with this header byte in step 178 before proceeding to set MEM_WRIT and VALID_ID equal to true in steps 180 and 182. The processor will proceed to step 166 and hence back to step 90. The processor will now proceed through steps 92 through 136 as has been previously discussed and will possibly note that the lower byte of memory address location having a memory address index of nine will not equal the current value of the NTWK_ID variable in a step 138. This will prompt the normal writing of the current value of the NTWK_ID variable to the memory locations nine through eleven in steps 142 through 154. The RE_RUN will be set equal to true in step 146 if this occurs. The processor will now proceed through steps 156 and 158 and set RE_RUN equal to false.

Referring again to steps 160, 168 and 176, the processor will proceed along the no paths out of each of these steps if no communications have been received by the processor for any of the noted variables. The processor will proceed out of step 176 to step 166 and execute any control routines before again returning to step 90. Since MEM_WRIT remains true, the processor will again proceed through steps 92 to 156. Assuming that all verifications are successfully made at the first reading of all upper and lower bytes from all memory locations, the processor will note that the RE_RUN is false in step 156. This will prompt the processor to proceed to a step 184 and set MEM_WRIT equal to false. Assuming no communications have been received for indexed variables zero through five or for the UNIT_TYPE or NTWK_ID control variables, the processor will proceed through steps 160, 168 and 176 to step 90. Since MEM_WRIT is now false, the processor will proceed along the no path out of step 90 to step 160. It is to be appreciated that the processor will continue to execute only steps 160, 168, 176, 166 and hence go back to step 90 until a communication has been received for any monitored variable. Any change in value of any variable associated with the memory locations having memory address indexes zero through eleven will prompt the reading and writing to either the single memory location for variables zero through five or the three designed memory locations for the UNIT_TYPE control variable or the three designated memory locations for the NTWK_ID variable. This reading and writing should result in a unique verification image being written to three separate memory locations for the UNIT_TYPE control variable and the three separate memory locations for the NTWK_ID variable. In the event such readings and writings are subject to a high electrical noise environment, then readings followed by writings will occur up to five successive times for each memory location. When repeated reading and writings are required to any of these locations, the processor will continue to note that a rerun condition is present and hence the entire process will be repeated until all memory locations are correctly read and verified the first time.

Referring again to step 40 in the event that power is turned off or lost at any time, the processor will note when power is again turned on. The processor will proceed to set the indexed variables associated with the memory locations having memory address indexes zero through five equal to read lower byte portions of these respective locations in steps 44 through 50. The processor will proceed next to steps 52 through 68 and examine as many of the addressable memory locations having memory address indexes of six through eight as is necessary to pass the tests dictated by steps 56 and 60. When a pair of upper and lower byte portions of one of these memory locations have the appropriate ones complement relationship required in step 56 and when the lower byte of the same location is within range in step 60, the processor will proceed to step 64 and set the UNIT_TYPE variable equal to the value of the lower byte portion of the particular memory location. In the event that none of the addressable memory locations have upper and lower byte portions that will pass the tests dictated by steps 56 and 60, the processor will proceed to step 66 and set the UNIT_TYPE variable equal to a default value.

Referring to steps 70 through 86, the processor will proceed to examine as many of the addressable memory locations having memory address indexes of nine through eleven as is necessary to pass the tests dictated by steps 74 and 76. This should normally result in the NTWK_ID variable being set equal to the lower byte portion of the first addressable memory location which passes the tests dictated by steps 74 and 76. If no such memory locations pass these tests, then the NTWK_ID variable is set equal to the default value in step 84.

It is to be appreciated from the above that a process has been disclosed for accurately reading and writing the values of NTWK_ID and the UNIT_TYPE variable to a number of memory locations associated with each variable. The writing of the values of these variables is also accompanied by a corresponding writing of the verification image to second portions of the same memory locations. A writing to any of these locations is accompanied by a reading of all memory locations wherein values have been stored to verify that the values and corresponding verification images of all variables have been correctly stored. Readings followed by writings will continue to occur until all recorded values and respective verification images can be read without any error.

It is to be appreciated that a particular embodiment of the invention has been described. Alterations, modifications and improvements thereto will readily occur to those skilled in the art. Accordingly, the foregoing description is by way of example only and the invention is to be limited only by the following claims and equivalents thereto.

What is claimed is:

1. A process for assigning values of identifications to networked HVAC systems within a communication network wherein the HVAC systems within the network can be identified and communicated with by other devices within the network using assigned values of network identifications to the HVAC systems, said process comprising the steps of:

transmitting a signal containing the value of a network identification to be assigned to a particular HVAC system in a predetermined signal format;

receiving the signal containing the value of the network identification at a receiver within the particular HVAC system that is to be assigned the network identification;

forwarding the value of the network identification to a programmed processor associated with the receiver within the particular HVAC system that is to be assigned the network identification; and assigning the value of the network identification to the HVAC system by storing the value of the network identification in a non-volatile memory associated with the programmed processor so that the value stored in the memory can thereafter be used by the programmed processor to identify the particular HVAC system within the network.

2. The process of claim 1 further comprising the step of:

reading the value of the network identification stored in the nonvolatile memory following an outage of electrical power to the HVAC system;

setting a network identifier variable equal to the value of the network identification read from the nonvolatile memory so that the value of the network identifier variable can thereafter be used by the processor in identifying the particular HVAC system within the network.

3. The process of claim 1 further comprising the steps of:

transforming the value of the communicated network identification to a verification image in accordance with a particular mathematical transformation; and storing the verification image in the nonvolatile memory in association with the stored value of the network identification.

4. The process of claim 3 further comprising the steps of:

reading both the value of the network identification stored in the nonvolatile memory and the value of the verification image associated therewith;

comparing the read values of the network identification and the associated verification image to determine whether the value of the verification image has a predetermined mathematical relationship with respect to the value of the network identification that is dictated by said step of transforming the value of the network identification to the verification image; and setting a network identifier variable equal to the value of the network identification read from the nonvolatile memory when the read values of the network identification and associated verification image have the mathematical relationship dictated by said step of transforming the value of the network identification whereby the value of the network identifier variable can be used by the processor in identifying the particular HVAC system.

5. The process of claim 1 wherein said step of transmitting a signal containing the value of a network identification in a predetermined signal format comprises the step of:

transmitting a header code for the network identification followed by the value of the network identification.

6. The process of claim 5 wherein said step of receiving the signal containing the network identification comprises the steps of:

temporarily storing the header code in association with value of the network identification.

7. The process of claim 6 wherein said step of storing the value of the network identification comprises the step of:

reading the temporarily stored header code for the network identification;

associating the temporarily stored header code with a network identifier variable;

setting the network identifier variable equal to the value of the network identification associated with the header code; and storing the value of the network identifier variable equal to in the memory associated with the programmed processor.

8. The process of claim 7 wherein said step of associating the temporarily stored header code with the network identifier variable comprises the step of:

looking up the header code in a table containing various header codes of possible control values of parameters that can be received by the processor, each header code being associated with a particular variable used in a program executable by the processor.

9. The process of claim 1 wherein said step of storing the value of the network identification in a non-volatile memory includes the step of:

writing the value of the network identification to at least one addressable location in the non-volatile memory that has been set aside for storing a value of the network identification.

10. The process of claim 9 further comprising the steps of:

transforming the value of the network identification verification image in accordance with a particular mathematical transformation; and storing the value of the verification image in a portion of each addressable location set aside for receiving value of the network identification.

11. The process of claim 10 further comprising the step of:

reading the stored value of the network identification from each addressable location set aside to receive value of the network identification;

reading the stored verification image of the stored value of the network identification from each such addressable location;

comparing the read verification image of the stored value of the network identification with the read value of the network identification from each addressable location set aside to receive the network identification to determine whether the verification image reflects the mathematical relationship dictated by said step of transforming the value of the network identification to verification image; and rewriting the value of the network identification and the verification image to any addressable memory location when the read verification image does not have the predetermined mathematical relationship with respect to the read value of the network identification variable for that addressable memory location.

12. The process of claim 10 further comprising the step of:

reading both the value of the network identification and the value of the verification image from at least one addressable memory location in the nonvolatile memory set aside for storing a value of the network identification following an outage of electrical power to the HVAC system;

comparing the values of the network identification and verification image read from the at least one addressable location to determine whether the value of the verification image has a predetermined mathematical relationship with respect to the value of the network identification dictated by said step of transforming the value of the network identification to the verification image; and setting a network identifier variable equal to the value of the network identification read from the at least one addressable location when the read values of the network identification and verification image have the predetermined mathematical relationship dictated by said step of transforming the value of the network identification to the verification image whereby the value of the network identifier variable can be used by the processor in identifying the particular HVAC system within the network.

13. The process of clam 12 further comprising the step of:

reading both the value of the network identification and the value of the verification image from the at least one further addressable location in the nonvolatile memory set aside for storing a value of the network identification following an outage of electrical power to the HVAC system when the read values of the network identification and the verification image from the previously read memory location do not have the predetermined mathematical relationship dictated by said step of transforming the value of the network identification to the verification image;

comparing the values of the network identification and verification image read from the at least one further addressable location to determine whether the value of the verification image has the predetermined mathematical relationship with respect to the value of the network identification dictated by said step of transforming the value of the network identification to the verification image; and setting a network identifier variable equal to the value of the network identification read from the at least one further addressable location when the read values of the network identification and verification image have the predetermined mathematical relationship dictated by said step of transforming the value of the network identification to the verification image whereby the value of the network identifier variable can be used by the processor in identifying the particular HVAC system within the network.

14. The process of claim 13 further comprising:

setting the network identifier variable equal to a default value when the read values from all addressable locations in the nonvolatile memory set aside for storing a value of the network identification fail to demonstrate the predetermined relationship dictated by said step of transforming the value of the network identification to the verification image whereby the value of the network identifier variable is be used by the processor in identifying the particular HVAC system within the network.

15. The process of claim 1 wherein the network identification is the network address of the HVAC system used by other network devices to address the particular HVAC system.

16. The process of claim 15 wherein said step of transmitting a signal containing the value of the network identification comprises the step of:

transmitting a signal containing the value of the network identification from a device that is not itself part of the communication network of devices which address the HVAC system when communication is to occur with the HVAC system over the network.

17. The process of claim 1 wherein the communication network comprises a communication bus utilized to transmit communications to devices connected thereto including the HVAC systems and wherein said step of transmitting a signal containing the value of the network identification comprises the step of:

transmitting the value of the network identification from a device that is not connected to the communication bus utilized to transmit communications to devices connected thereto.

18. A communications network comprising a plurality of HVAC devices connected to a communications bus wherein at least some of the HVAC devices receive communications over the communications bus from other devices connected to the communications bus wherein at least one of the HVAC devices receiving the communications comprises:

a receiver for receiving a communicated network identification of the HVAC device;

a processor for processing the network identification of the HVAC device; and a nonvolatile memory associated with the processor for storing the processed network identification of the HVAC device so that the processed network identification of the HVAC device can be thereafter used by devices connected to the communications bus to address the HVAC device when communication is to occur with the HVAC device over the communication bus.

19. The communications network of claim 18 furthermore comprising:

a device not connected to the communications bus for communicating the network identification of the HVAC device to said receiver for receiving the communicated network identification of the HVAC device.

* * * * *